(12) United States Patent
Bates et al.

(10) Patent No.: US 6,218,828 B1
(45) Date of Patent: Apr. 17, 2001

(54) SENSING SYSTEM FOR DETERMINING AN ARTICULATION ANGLE BETWEEN TWO ELEMENTS

(75) Inventors: Kent C. Bates, Chillicothe; Igor Strashny, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/217,369

(22) Filed: Dec. 21, 1998

(51) Int. Cl.$^7$ .................................................. G01B 7/14
(52) U.S. Cl. ............................. 324/207.2; 324/207.11; 324/207.22
(58) Field of Search ........................... 324/207.2, 207.21, 324/207.22, 207.24, 207.25, 207.26, 207.14, 207.11, 225, 235; 338/32 H, 32 R

(56) References Cited

U.S. PATENT DOCUMENTS

| | | | |
|---|---|---|---|
| 4,330,748 | * 5/1982 | Hoden | 324/225 |
| 4,857,842 | 8/1989 | Sturman et al. | 324/225 |
| 4,990,850 | * 2/1991 | Votruba | 324/225 |
| 5,041,785 | * 8/1991 | Bogaerts et al. | 324/207.24 |
| 5,336,996 | 8/1994 | Rusnak | 324/207.2 |
| 5,670,877 | 9/1997 | Scheiber | 324/207.25 |
| 5,682,095 | 10/1997 | Mathes et al. | 324/174 |
| 5,793,201 | * 8/1998 | Nelle et al. | 324/207.14 |

OTHER PUBLICATIONS

Patent Application Docket No. 97–650, entitled "Sensor for Computing the Angular Velocity of a Rotational Body," Filed Nov. 17, 1998.

* cited by examiner

*Primary Examiner*—Christine Oda
*Assistant Examiner*—S. Zaveri
(74) *Attorney, Agent, or Firm*—W. Bryan McPherson III

(57) ABSTRACT

The present invention provides an apparatus and a method for determining the position of a first element relative to a second element. The apparatus includes a magnet being attached to the first element. First and second sensing devices are adapted to detect a magnetic flux density produced by the magnet and responsively generating first and second signals. The apparatus also includes a controller for receiving the first and second signals and responsively determining the position of the first element relative to the second. The present invention enables continuous calibration during the normal operation of the machine.

15 Claims, 5 Drawing Sheets

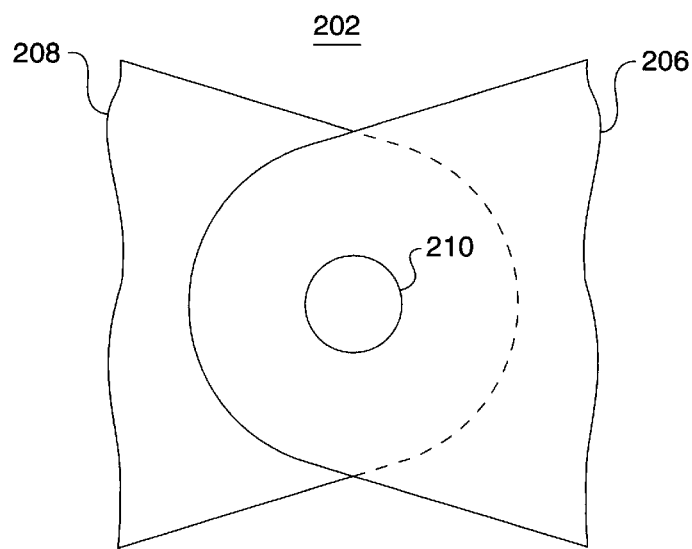
Fig-2b-
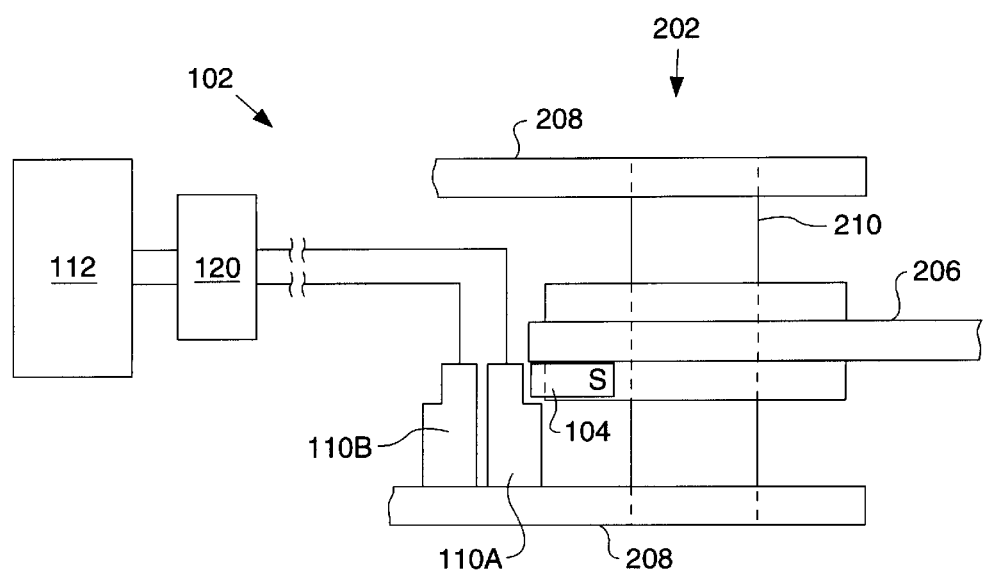
Fig-2c-

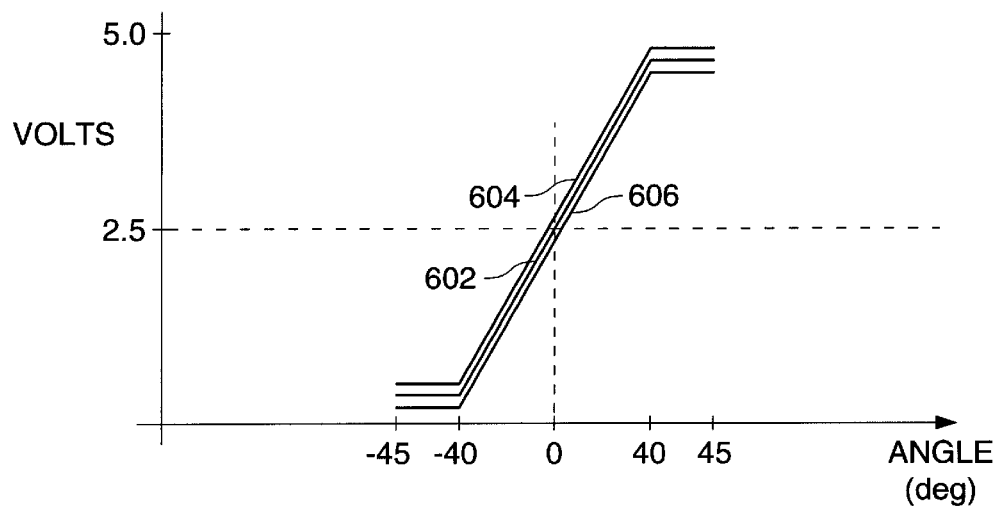
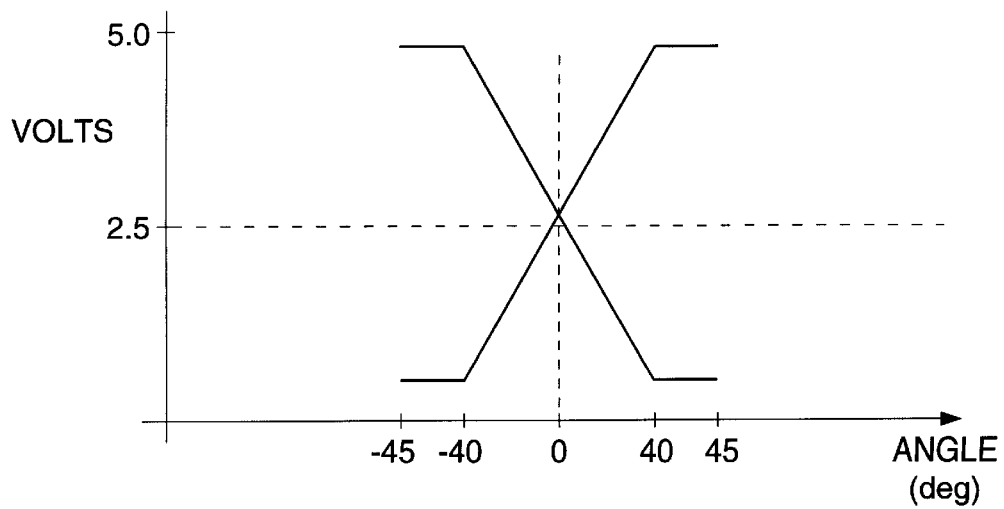

SENSING SYSTEM FOR DETERMINING AN ARTICULATION ANGLE BETWEEN TWO ELEMENTS

TECHNICAL FIELD

The present invention relates to sensing the position of a first element relative to a second element and, more particular, to a novel method and apparatus for sensing the articulation angle between a first and second element.

BACKGROUND ART

In articulated machines, such as, but not limited to, articulated wheel loaders or motor graders, it is important to be able to determine the articulation angle of the machine. This information enables the function of various electronic control systems during the operation of the machine. These systems include, but are not limited to, "steer-by-wire", automatic yaw control, and torque control systems. However, there are several obstacles in trying to determine the articulation angle using present devices. In one embodiment, a potentiometer is used to measure an articulation angle. However, temperature, age and the limited number of cycles due to contact technology, confines its use to less demanding applications. Drift of such devices requires a periodic calibration routine to be executed to ensure satisfactory operation. These calibration routines are time consuming, highly inconvenient, and have to be performed as a separate operation of the machine.

The present invention is directed to overcoming one or more of the problems identified above.

DISCLOSURE OF THE INVENTION

In one aspect of the invention, an apparatus for determining the position of a first and a second element relative to each other is disclosed. The apparatus includes a magnet being attached to the first element, a first and second sensing device being adapted to detect a magnetic flux density of the magnet and a controller adapted to determine a position of said first element relative to said second element.

In another aspect of the invention, a method for determining a position of a first element having a magnet and a second element having a plurality of sensing devices, relative to each other. The method includes the steps of sensing the magnetic flux density of the magnet and determining a position of said first element relative to said second element in response to the first and second sensed flux densities.

These and other aspects and advantages of the present invention will become apparent upon reading the specification in connection with the drawings and claims.

BRIEF DESCRIPTION OF THE DRAWINGS

Understanding the present invention and the various aspects thereof will be facilitated by reference to the accompanying drawings, which are illustrative and are not intended to define the scope of the invention:

FIG. 6 is a graph of a voltage level and a corresponding articulation angle, and example offsets; and FIG. 7 is a graph illustrating the voltage level and corresponding articulation angle.

BEST MODE FOR CARRYING OUT THE INVENTION

Throughout this description and the drawings like elements will be referred to with consistent identifying element numbers throughout the various figures. The following description, in connection with the drawings, provides a full and complete description of several embodiments of the present invention. These embodiments, however, do not define the invention, but should be referred to as examples of the invention defined by the appended claims.

Figure 1:
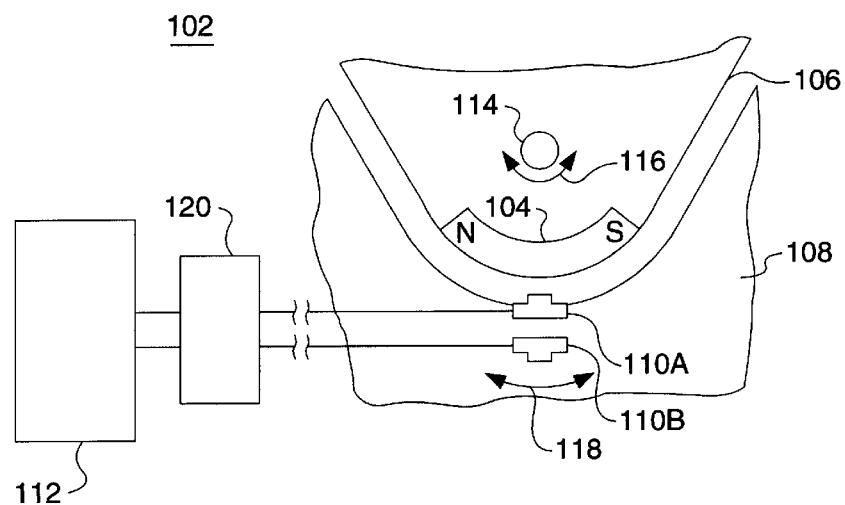
FIG. 1 is a high level diagram of one embodiment of a sensing system.
Figure 2A:
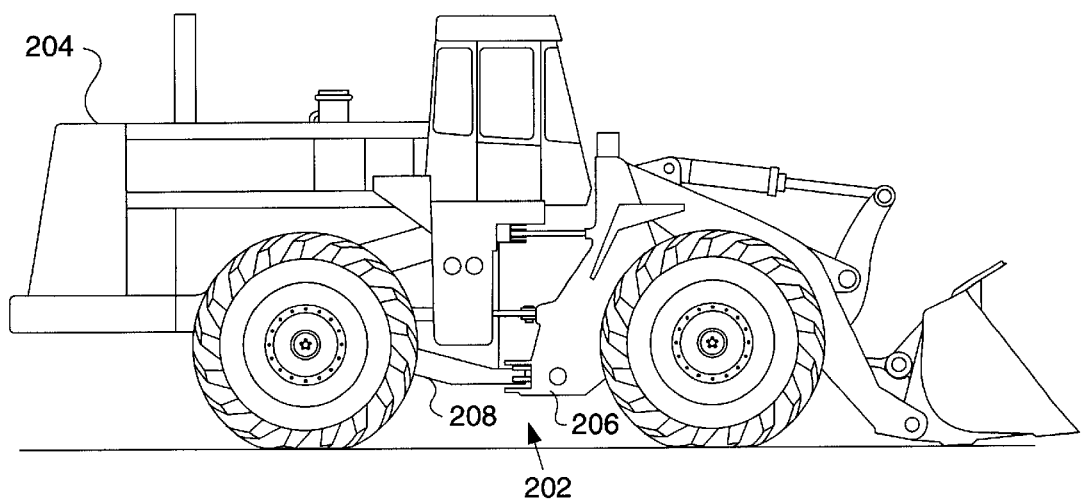
FIG. 2 is an illustration an alternative embodiment of the sensing system.

The present invention provides an apparatus and method for determining the position of a first and second element relative to each other. FIG. 1 is an illustration of one embodiment of the apparatus, a sensing system 102, which may be used to determine the position of a first and second element 106, 108 relative to each other. FIGS. 2A, 2B, and 2C illustrate an alternative embodiment of the sensing system 102 being applied to the articulation joint 202 of a motor grader 204. The front part of the frame 206 articulates with respect to the rear part 208, about the pin 210. However, the illustrations of FIGS. 2A, 2B, and 2C are for descriptive purposes only and should not be construed to limit the application of the present invention.

Referring again to FIG. 1, in one embodiment, the first element 106 is a disk attached to a shaft, or pin, 114 in a manner enabling the disk 106 to rotate about the axis, or pin 114 in the directions generally indicated by arrow 116. The disk 106 rotates in a manner relative to a second element 108.

The sensing system 102 includes a magnet 104 attached to the first element 106. In the preferred embodiment the magnet 104 is an arc shaped magnet having a north pole and a south pole, as illustrated in FIG. 1. However, other alternative embodiments of the magnet 104 include a straight magnet, bar magnet or a ring magnet. The strength of the magnetic flux, generated by the magnet 104, as seen by elements 110, varies as the first element 106 articulates relative to second element 108. The measured flux density is zero at the center of the length of the magnet 104, i.e. at a position equadistance to the north and south pole of the magnet 104. The position equadistance to the north and south pole of the magnet 104, where the magnetic flux density is zero, may be referred to as the zero point.

In an alternative embodiment, the disk 106 may be replaced by an arm or other similar fixture such that the first element 106 may provide support for the magnet 104 and permits the magnet 104 to travel about the axis or pin 114, relative to the second object 108.

The second element 108, may be a stationary element, or may move relative to the first element 106. For example, the second element 108 may move in the direction generally indicated by arrow 118. Alternatively, both the first and second element 106, 108, may move relative to each other as illustrated in FIG. 2.

The sensing system 102 includes a first and second sensing device 110A, 110B attached to the second element 108. In the preferred embodiment the first and second sensing device 110A, 110B are non-contacting Linear Hall Effect sensors. However, other sensing devices that sense, or detect, magnetic flux density may be used, such as a magnetoresistive sensor. The first and second sensing devices 110A, 110B are adapted to detect the magnet flux density produced by the magnet 104, and responsively generate a first and second signal respectively. The magnitudes of the first and second signals are a function of the sensed magnetic flux density. In the preferred embodiment, the sensors 110A, 110B are located proximate to the outer circumference of the arcuate path traveled by the arc magnet 104. The sensing devices 110A, 110B are located in a position such that the sensing devices 110A, 110B produce signals responsive to the passing of the magnet 104 near the sensing devices 110A, 110B. The sensed magnetic flux density varies with respect to the angular position of the arc magnet 104 relative to the sensing devices 110A, 110B. The first and second elements 106, 108 are interchangeable for the purpose of this invention. That is, the magnet 104 may be located on the second element 108, and a first and second sensing device 110A, 110B may be attached to the first element 106.

Figure 3:
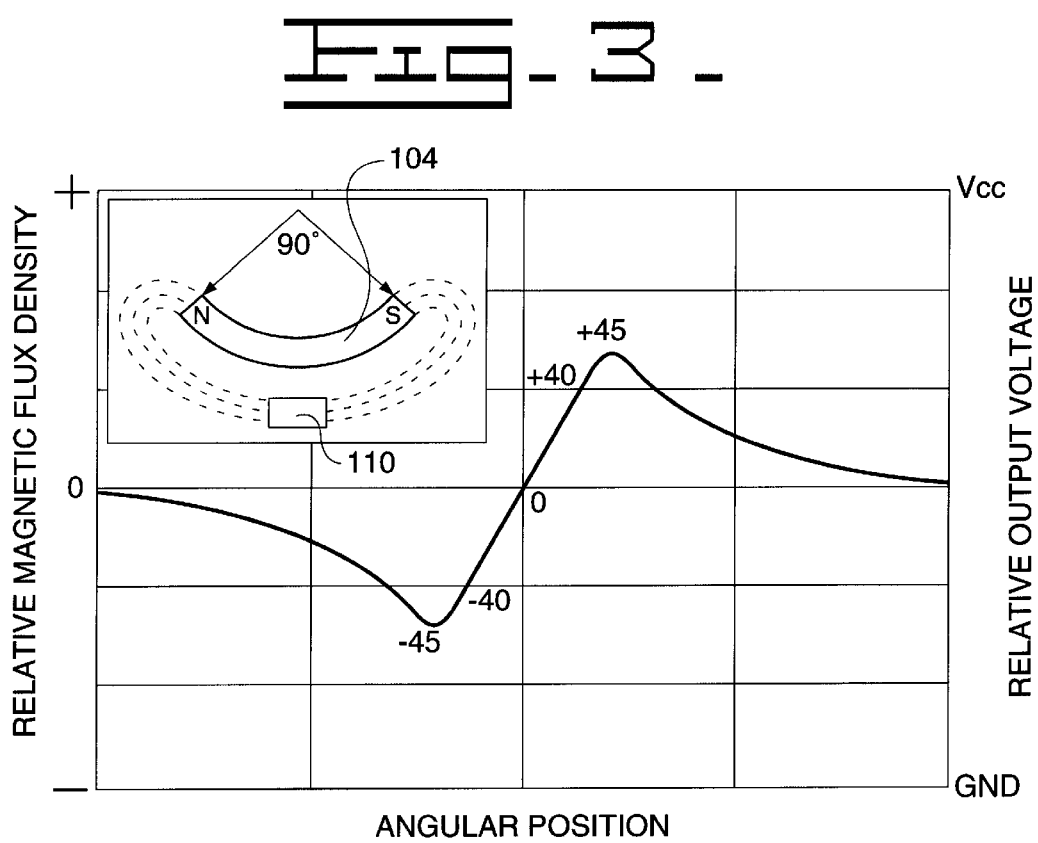
FIG. 3 is a graph of voltage level and a corresponding magnetic flux density.

FIG. 3 illustrates the magnetic flux density and the corresponding output signal sensed by one sensing device 110, as the magnet 104 rotates relative to the sensing device 110. A linear transfer function may be used to represent the sensed flux density for approximately the length of the magnet, +/−10% from either end of the magnet. For example, for an arc magnet of 90 degrees, a linear transfer function may be used to represent the sensed flux density for about +/−40 degrees of motion of the arc length from the zero point, which is defined as a point equadistance from either end of the magnet. The zero point may be used to indicate the point where the angular position of the first element 106 relative to the second element 108 is zero degrees.

Figure 4:
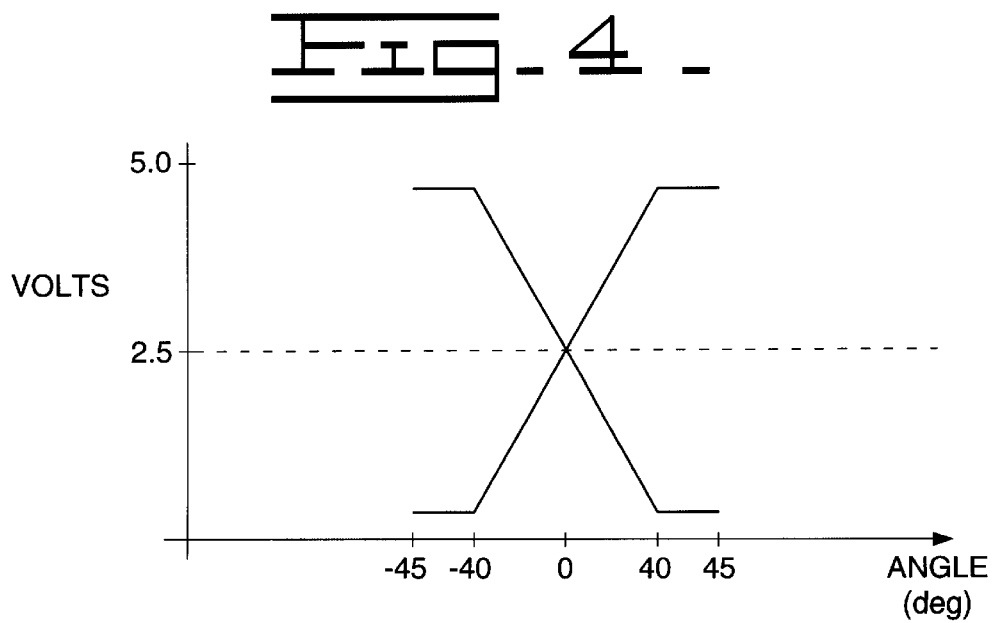
FIG. 4 is a graph of voltage level and a corresponding articulation angle using multiple sensing devices.

In the preferred embodiment, the sensing devices 110A, 110B are sensitive to the orientation relative to the magnet 104. That is, reversing the direction of the magnetic flux to the sensing device reverses the resulting slope of the transfer function. Therefore, if two sensing devices 110A, 110B are placed adjacent to each other such that they are back to back, as illustrated in FIG. 1, then the slope of the transfer functions resulting from sensing the flux density will be the inverse of each other, as illustrated in FIG. 4. In the preferred embodiment, the first and second sensing devices 110A, 110B are placed adjacent to each other such that the slope of the transfer functions are inverse to each other.

Referring again to FIG. 1, the sensing system 102 also includes a controller 112. The controller 112 is electrically connected to the first and second sensing device 110A, 110B and receives the first and second signals. The controller 112 determines the position of the first and second element 106, 108 relative to each other in response to the first and second output signals. In the preferred embodiment an analog to digital converter 120 is electrically connected between the first and second sensing devices 110A, 110B and the controller 112, as illustrated in FIG. 1. The analog to digital converter 120 converts the analog input signals to a digital form and delivers them to the electronic controller 112. As is known to those skilled in the art, there are various signal conditioning and input/output circuitry associated with electrical communications between an electronic controller and sensors. Such circuitry is well known in the art and, although not shown in the figures, nor described herein, would be included in each of the embodiments of the present invention where appropriate. Also, as is known to those skilled in the art, the electronic controller 112 may be capable of processing analog data or signals thereby alleviating the need for an analog to digital converter 120.

Figure 5:
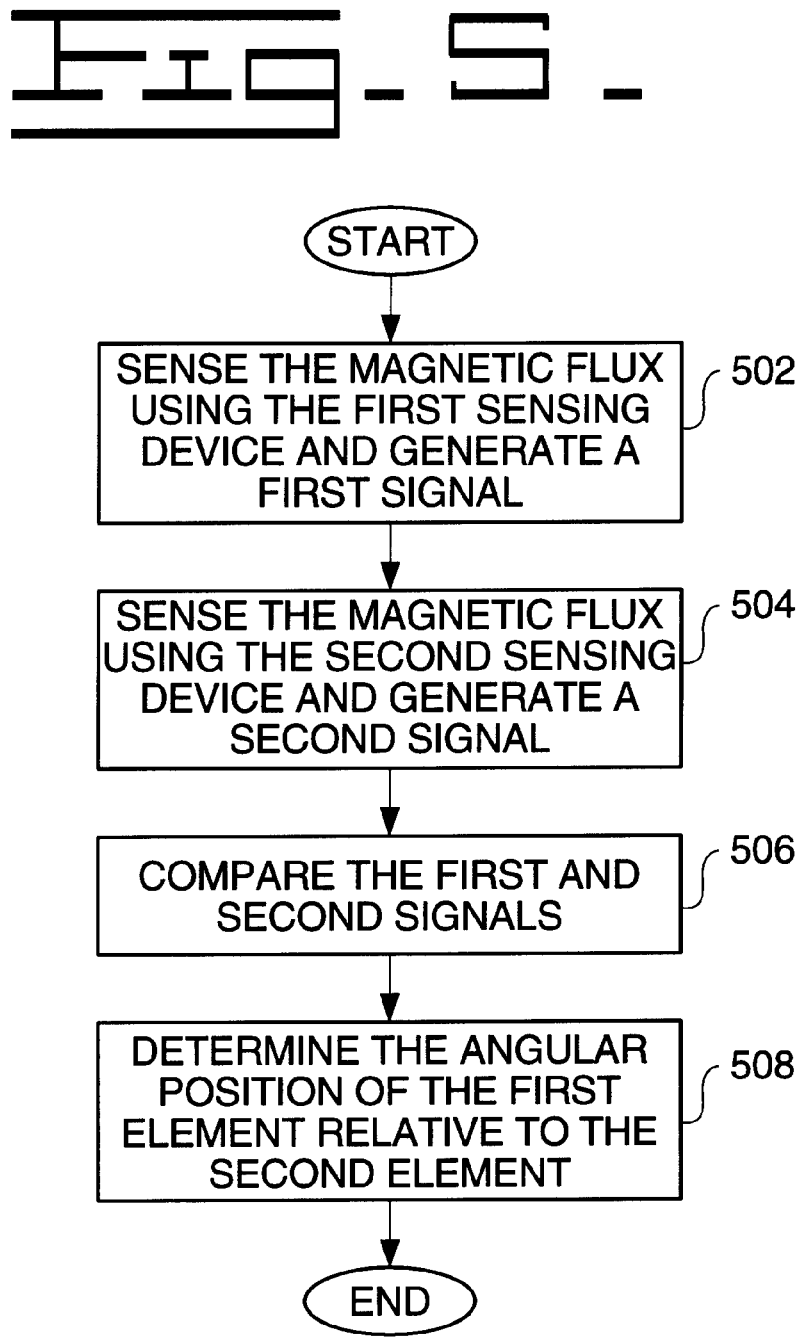
FIG. 5 is an illustration of the method for determining the position of the first element relative to the second element.

Referring to FIG. 5, a flow chart representative of the operation of the present invention is illustrated. In a first control block 502, the first sensing device 110A senses the magnetic flux and responsively generates a first signal. In a second control block 504, the second sensing device 110B senses the magnetic flux and responsively generates a second signal. In a third control block 506, the controller receives and compares the first and second signals. In a fourth control block 508, the controller 112 determines the angular position of the first element 106 relative to the second element 108 in response to first and the second signals. In one embodiment, the controller 112 compares the magnitude of the first and second signals, which are representative of the sensed magnetic flux density. When the magnitude of the first and second signals are within a predetermined threshold of each other, the zero point has been located. Once the zero point has been located, the zero point may be used to calibrate the control systems on the machine during the normal operation.

As described above, FIG. 4 illustrates an example of a voltage versus angle of articulation plots as sensed by the first and second devices 110A, 110B. The voltage is illustrated as a function of the angular position of the magnet 104 relative to the sensing devices 110A, 110B. As described above, the flux density sensed by a sensing device 110 is 0 when the sensing device 110 is located at the zero point, i.e., equadistance to the north and south poles of the magnet 104. The zero point may be detected by the controller 112 as the location where the magnitude of the first signal is equal to the magnitude of the second signal. As the temperature changes, the output of the sensing device may fluctuate, or the strength of the magnet may change, the signal levels and associated slopes of these signals, as plotted throughout the range of motion of the first and second element 106, 108, may shift, as illustrated in FIG. 6. Line 602 represents the output signal under normal operating conditions, and line 604 and line 606 are examples of the output signal resulting from changes in temperature or aging of the components. As stated above, in the preferred embodiment the first and second sensing devices 110A, 110B are placed back to back in a manner such that the slopes of the transfer functions resulting from sensing the flux density will be the inverse of each other. It is a reasonable assumption both sensing devices will be affected similarly by temperature or aging of the components. That is, the zero point, i.e., point where the magnitude of the signals are equal within a specified tolerance, does not change even though the individual signal slopes and offsets of the transfer functions represented by the signals may change, as illustrated in FIG. 7. Therefore, by using two sensors located back to back, the effects of temperature, aging, or wear of the components does not effect the ability to determine the articulated position of the first and second element 104, 106 relative to each other.

INDUSTRIAL APPLICABILITY

The present invention provides an apparatus and a method for determining the angular position of a first element relative to a second element. The apparatus includes a magnet being attached to the first element. First and second sensing devices are adapted to detect the magnetic flux density of the magnet and responsively generating first and second signals. The apparatus also includes a controller for receiving the first and second signals and responsively determining the position of the first element relative to the second.

In one embodiment of the present invention, the apparatus is applied to an articulation joint 202 of a motor grader, as illustrated in FIG. 2. As illustrated in FIG. 2B, the magnet 104 may be placed on the first member 206 of the articulated joint, and the first and second sensing device 110A, 110B are placed on the second member 208 of the articulated joint 202. In the preferred embodiment, the first and second sensing devices 110A, 110B are packaged together. The placement of the sensing devices relative to the magnet is such that when the sensing devices detect equal flux density, i.e., they are equadistance to the ends of the magnet, then the articulation joint is at a zero point, i.e., the machine is pointing in the straight forward position, assuming the magnet 104 and sensors 110A, 110B were properly located and installed on the machine. As the first member of the articulated joint rotates side to side relative to the second member, the sensors continue to detect the magnetic flux density and deliver signals to the controller having slopes which are the inverse of each other. Therefore the first and second signals may be compared with each other, and when they are equal in magnitude, within some threshold of error, the articulation joint may be determined to be at the zero point indicating zero degrees of articulation. By monitoring the signals to determine when the magnitudes are equal, the controller will be able to determine when the zero point is achieved regardless of variations of temperature, wear, or age of the magnets or sensors, providing means of continuous calibration information. In the preferred embodiment, the first and second sensor behave similarly with respect to sensing the magnetic flux density. In one embodiment, the sensors may be developed on the same substrate to ensure similar operating characteristics. However, the operating characteristics of two separate Linear Hall effect sensors will be close enough to be within an acceptable tolerance limit for the present application.

The advantages of the present invention include the ability to detect the position of the first element relative to the second element, throughout the life cycle of the application. In addition, the sensing apparatus is, in effect, self calibrating. As one signal is affected, for example, due to temperature or other environmental influences, the other signal is affected as well. Therefore the zero point is detectable despite changes in the environmental conditions, or age or wear of the magnet or sensing devices.

In one embodiment, once the zero point is determined, the signal from one sensing device is used to determine the actual articulation angle of the machine. The present invention uses two sensing devices to calibrate the zero point. Therefore, the signals of the sensing devices may be used as a cross check to verify the functionality of the sensing devices during the determination of the articulation angle.

The sensing apparatus may be used in other embodiments such as measuring the articulation angle of a wheel loader, the angle of the bed of an off highway truck, as the bed is raised and lowered. In addition, the angle of rotation of a steering wheel may be determined using the present invention.

Other aspects, objects, and advantages of the present invention can be obtained from a study of the drawings, the disclosure, and the claims.

What is claimed is:

1. An apparatus for determining the position of a first and a second element relative to each other comprising:
   a magnet being attached to the first element, said magnet having a magnetic flux density;
   a first sensing device being adapted to detect said magnetic flux density and responsively generate a first signal, said first device being attached to said second element;
   a second sensing device being adapted to detect said magnetic flux density and responsively generate a second signal, said second device being attached to said second element; and
   a controller adapted to receive said first and said second signals and responsively determine a position of said first element relative to said second element.

2. An apparatus, as set forth in claim 1, wherein said first and said second sensing device are attached in a manner such that a first slope of a first transfer function represented by said first signal is an inverse of a second slope of a second transfer function represented by said second signal.

3. An apparatus, as set forth in claim 1, wherein said first and said second sensing device are attached in a manner such that a first slope of a first transfer function representing said magnetic flux density detected by said first sensing device is an inverse of a second slope of a second transfer function representing said magnetic flux density detected by said second sensing device.

4. An apparatus, as set forth in claim 2, wherein said controller determines said first and second sensing devices are located equadistance from a north and a south pole of said magnet when a magnitude of said first signal is within a threshold of a magnitude of said second signal.

5. An apparatus, as set forth in claim 4, wherein said controller determines an angular position of said first element relative to said second element in response to said first signal magnitude and said second signal magnitude.

6. A method for determining a position of a first element having a magnet and a second element having a plurality of sensing devices, relative to each other, said magnet having a magnetic flux density, the method comprising the steps of:
   sensing said magnetic flux density with said first sensing device and responsively generating a first signal;
   sensing said magnetic flux density with said second sensing device and responsively generating a second signal; and
   determining a position of said first element relative to said second element in response to said first and said second signals.

7. A method, as set forth in claim 6, wherein said first sensing device is located adjacent to said second sensing device in a manner such that a first slope of a first transfer function represented by said first signal is an inverse of a second slope of a second transfer function represented by said second signal.

8. A method, as set forth in claim 6, wherein said first and said second sensing device are attached in a manner such that a first slope of a first transfer function representing said magnetic flux density detected by said first sensing device is an inverse of a second slope of a second transfer function representing said magnetic flux density detected by said second sensing device.

9. A method, as set forth in claim 6, wherein the step of determining said position further comprises the steps of:
   comparing said magnitude of said first and said second signals; and
   determining said position in response to said comparison.

10. A method, as set forth in claim 9, wherein the step of determining said position in response to said comparison further comprises the step of determining said first and second sensing devices are located equadistance from a north and a south pole of said magnet when a magnitude of said first signal is within a threshold of a magnitude of said second signal.

11. A method, as set forth in claim 6, further including the step of determining a zero point of the magnet in response to the magnitude of the first signal being within a threshold of the magnitude of the second signal.

12. A method, as set forth in claim 11, further including the step of determining said articulation angle in response to the zero point, and one of said first and said second signals.

13. A method, as set forth in claim 11, further including the step of determining said articulation angle in response to the zero point, and at least one of said first and said second signals.

14. An apparatus, as set forth in claim 1, wherein said controller is further configured to determine a zero point of said magnet in response to the magnitude of the first signal being within a threshold of the magnitude of the second signal.

15. An apparatus, as set forth in claim 14, wherein said controller is further configured to determine said articulation angle in response to the zero point, and one of said first and said second signals.

* * * * *